United States Patent [19]
Richter

[11] Patent Number: 5,187,744
[45] Date of Patent: Feb. 16, 1993

[54] HAND-HELD PORTABLE TELEPHONE HOLDER

[76] Inventor: Gary L. Richter, 1485 Southern Way, Sparks, Nev. 89431

[21] Appl. No.: 818,630

[22] Filed: Jan. 10, 1992

[51] Int. Cl.⁵ .......................... H04M 1/00; B60R 7/00
[52] U.S. Cl. ................................... 379/449; 379/426; 379/455; 224/42.42
[58] Field of Search ............... 379/454, 446, 447, 449, 379/450, 455, 457, 426, 428, 424; 381/86, 87; 455/89, 90; 224/273, 281, 282, 42.42, 42.43, 42.44, 42.45 R; 248/309.1, 222.2, 231.8, 214, 316.4–316.6, 311.2, 313

[56] References Cited

U.S. PATENT DOCUMENTS

| | | | |
|---|---|---|---|
| De. 308,205 | 5/1990 | Tholberg | D14/253 |
| 1,026,260 | 5/1912 | Guthrie . | |
| 2,481,271 | 9/1949 | Willey | 179/148 |
| 2,509,793 | 5/1950 | Yost | 248/300 |
| 2,597,670 | 5/1952 | Pinto | 179/147 |
| 2,663,764 | 12/1953 | Holmes | 179/150 |
| 2,792,932 | 5/1957 | Freistat | 206/13 |
| 3,040,900 | 6/1962 | Jones | 211/35 |
| 3,184,548 | 5/1965 | Krulwich | 179/148 |
| 3,433,446 | 3/1969 | Meder | 248/316 |
| 4,023,757 | 5/1977 | Allard et al. | 248/70 |
| 4,472,606 | 6/1984 | Krolopp et al. | 179/146 |
| 4,560,831 | 12/1985 | Bast et al. | 379/454 |
| 4,776,553 | 10/1988 | Kobayashi | 248/558 |
| 4,836,485 | 6/1989 | Cooper | 248/278 |
| 4,842,174 | 6/1989 | Sheppard et al. | 224/273 |
| 4,845,738 | 7/1989 | Takano | 379/58 |
| 4,878,237 | 10/1989 | Cianflone | 379/58 |
| 4,892,486 | 1/1990 | Guzik et al. | 439/248 |
| 4,915,273 | 4/1990 | Allen | 248/316.4 |
| 4,943,111 | 7/1990 | VanderLaan | 248/311.2 |
| 5,033,709 | 7/1991 | Yuen | 379/454 |
| 5,060,260 | 10/1991 | O'Connell | 379/454 |
| 5,060,899 | 10/1991 | Lorence et al. | 248/311.2 |

FOREIGN PATENT DOCUMENTS 2403697  5/1979  France .

*Primary Examiner*—James L. Dwyer
*Assistant Examiner*—Jack Chiang
*Attorney, Agent, or Firm*—Stetina and Brunda

[57] ABSTRACT

A hand-held portable telephone holder for releasably holding a hand-held portable car telephone has two laterally adjustable fingers disposed upon one side of a substantially planar body and two spring biased fingers pivotally disposed upon the opposite side of the body such that a hand-held portable telephone may be positioned intermediate the first and second fingers and grasped under spring tension thereby. The hand-held portable telephone is disposed intermediate the first and second fingers by first placing the hand-held portable telephone in contact with the second fingers and utilizing the hand-held portable telephone to urge the second fingers to pivot outwardly against spring tension, thus increasing the distance between the first and second fingers. The hand-held portable telephone is then disposed in laminar juxtaposition to the body of the holder. When the hand-held portable telephone is released, the second fingers pivot inwardly to capture the hand-held portable telephone between the first and second fingers. Lateral adjustment of the first fingers allows the hand-held portable telephone holder to accommodate hand-held portable telephones of various widths.

4 Claims, 3 Drawing Sheets

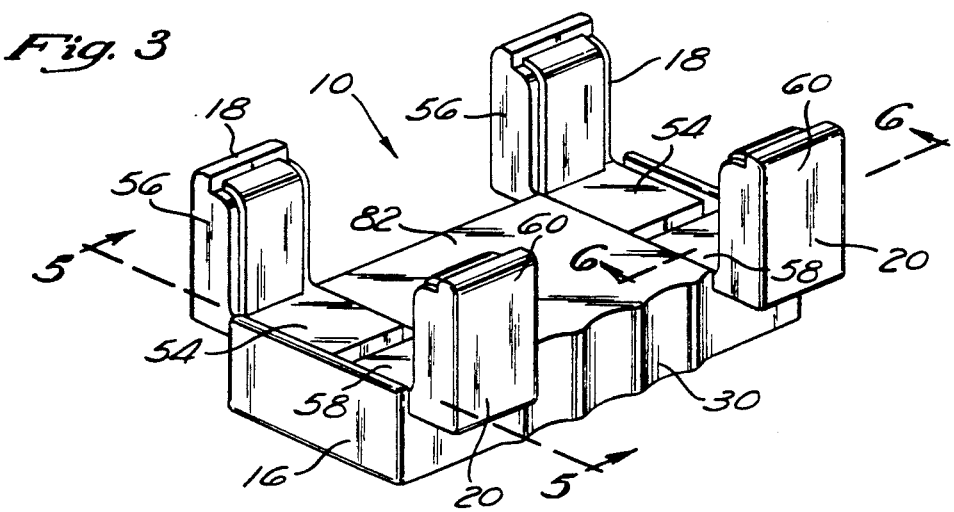
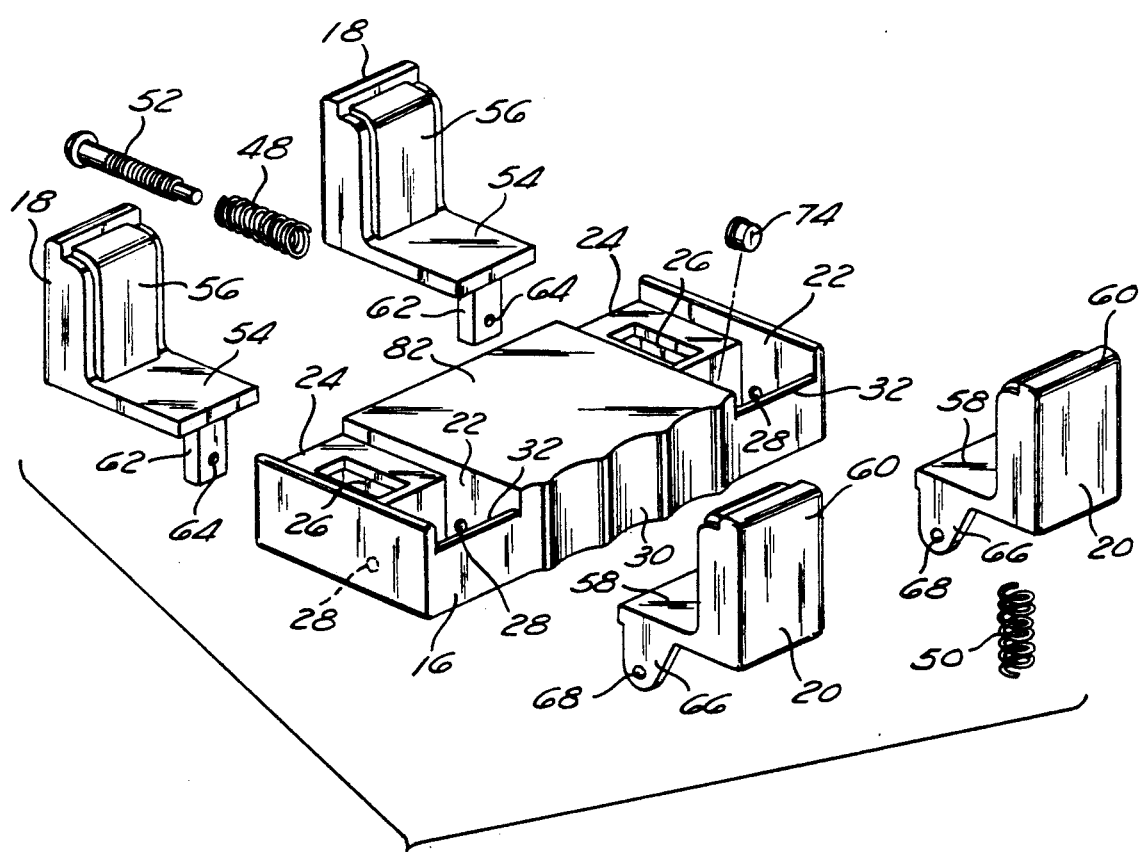

HAND-HELD PORTABLE TELEPHONE HOLDER

FIELD OF THE INVENTION

The present invention relates generally to clamping devices and more particularly to a hand-held portable telephone holder for positioning a hand-held portable telephone at a desired location and orientation within an automobile.

BACKGROUND OF THE INVENTION

Portable telephones may conveniently be divided into three categories: car or mobile telephones, bag or transportable telephones, and hand-held portables.

Car or mobile telephones, commonly known as cellular car telephones, typically comprise a handset connected via a cord to electronics mounted within the car. The electronic hardware necessary for telecommunications is permanently disposed within the car such that the mobile telephone is not generally removed from the car.

Bag telephones or transportables typically comprise a handset connected via a cord to a bag or brief case-like container which houses batteries and the electronics necessary for telecommunications. Such bag telephones may thus be easily transported by hand and need not remain within the vehicle.

Completely self-contained hand-held portable telephones are rapidly gaining popularity as their cost decreases. Contemporary hand-held portable telephones which easily fit within a shirt pocket provide the ultimate in flexibility and convenience. Such hand-held portable telephones may be carried anywhere without inconvenience.

Although hand-held portable telephones are lightweight and easy to carry, they do present a particular problem when used in automobiles. Unlike their predecessors, the original mobile telephones, hand-held portable telephones lack any means for being mounted or secured at a convenient location. As such, it is not uncommon for hand-held portable telephones to simply be laid upon the seat or dashboard proximate the user. Since they are not secured in place, such hand-held portable telephones are subject to being tossed about as the vehicle turns, brakes, and accelerates. Thus, contemporary hand-held portable telephones are commonly subjected to mechanical abuse which may result in damage thereto. It would be desirable to provide a means for securing such hand-held portable telephones at a convenient location whereby the user may maintain convenient access thereto. Such means for securing the hand-held portable telephone would prevent it from being tossed about by the motions of the vehicle and potentially damaged thereby.

Devices for mounting mobile telephone handsets, i.e. those connected via a cord to telecommunications electronics permanently disposed within the car, are well known. One such device is disclosed in U.S. Pat. No. 4,842,174 issued to Sheppard et al. on Jun. 27, 1989 and entitled FLEXIBLE MOUNT FOR MOBILE APPARATUS, the contents of which are incorporated herein by reference.

The Sheppard device utilizes a flexible, generally tubular support arm having threadably attached to one end thereof an equipment mounting member, and having threadably attached at the other end thereof a vehicle attachment member. Two alternative attachment members are disclosed. The first alternative attachment member is configured for mounting to a somewhat horizontal portion of the vehicle such as the floor, while the second alternative attachment member is configured for side mounting. The flexible support arm is configured to provide a measure of resistance to flexing sufficient to support the equipment without undesired movement during operation of the vehicle, while being sufficiently flexible to move away from the occupants in the event of impact. The mounting member and attachment member are relatively small in dimension and secure at extreme ends of the flexible portion of the support arm.

Although the Sheppard apparatus provides a high degree of flexibility in the positioning of a car telephone, the device does not address the attachment of a hand-held portable telephone thereto. Rather, the Sheppard apparatus relies upon a manufacturer or user supplied telephone attachment device and is intended for use with a mobile telephone handset, not for use with a hand-held portable telephone. Such attachment devices typically assume a given handset configuration. As such, they do not function with a wide variety of sizes and shapes of telephones.

Thus the Sheppard apparatus and similar prior art devices do not address the problem of providing a rapid and convenient attachment and detachment mechanism for securely holding a hand-held telephone at a desired location within an automobile. As such, although the prior art has recognized to a limited extent the problem of positioning a mobile telephone handset within an automobile, the proposed solutions have to date been ineffective in providing a complete and satisfactory remedy with respect to hand-held portable telephones.

As such, it would be desirable to provide a device for rapidly and conveniently storing a hand-held portable telephone at a desired location and orientation within an automobile. It would also be desirable to provide such a device which is capable of accommodating a wide variety of hand-held portable telephone sizes and configurations.

SUMMARY OF THE INVENTION

The present invention specifically addresses and alleviates the above mentioned deficiencies associated in the prior art. More particularly, the present invention comprises a device for holding an article, such as a hand-held portable telephone securely at a convenient location within an automobile.

The device has a body configured in a generally complimentary fashion to the article to be held and is preferably generally planar in configuration. At least one first finger extends upwardly from one side of the body and at least one second finger extends upwardly from the opposite side of the body, such that the article may be captured therebetween.

The first finger is adjustably attached to the body such that it may be varied in lateral position, thereby varying the distance between the first finger and the second finger. The second finger is pivotally attached to the body such that the second finger may be urged under a spring tension bias away from the first finger to facilitate receiving of the article to be held by the device. Thus, the first and second fingers are configured to capture the article therebetween when the article is positioned upon the body.

These, as well as other advantages of the present invention will become more apparent from the follow-

BRIEF DESCRIPTION OF THE DRAWINGS

FIG. 3 is a perspective view of the top of the hand-held portable telephone holder of FIG. 1;

FIG. 4 is an exploded perspective view of the hand-held portable telephone holder of FIG. 3;

DETAILED DESCRIPTION OF THE PREFERRED EMBODIMENT

The detailed description set forth below in connection with appended drawings is intended as a description of the presently preferred embodiment of the invention, and is not intended to represent the only form in which the present invention may be constructed or utilized. The description sets forth the functions and sequence of steps for constructing and operating the invention in connection with the illustrated embodiment. It is to be understood, however, that the same or equivalent functions and sequences may be accomplished by different embodiments that are also intended to be encompassed within the spirit and scope of the invention.

Although the following discussion is directed toward use of the present invention in conjunction with hand-held portable telephones, those skilled in the art will recognize that the present invention may be utilized to securely mount a wide variety of similar articles at a convenient location. Thus, discussion of the present invention in conjunction with a hand-held portable telephone is by way of example only and not by way of limitation.

Figure 1:
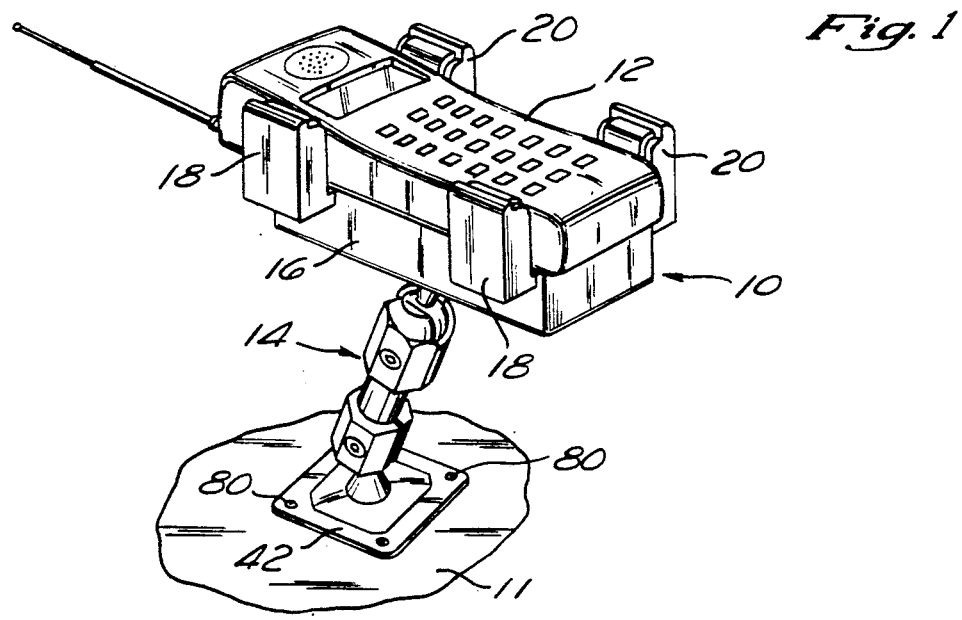
FIG. 1 is a perspective view of the telephone holder of the present invention having a hand-held portable telephone disposed thereupon.

The hand-held portable telephone holder of the present invention is illustrated in FIGS. 1-6 of the drawings which depict a presently preferred embodiment of the invention. Referring now to FIG. 1, the hand-held portable telephone holder 10 is comprised generally of a substantially planar body 16 having at least one, preferably two, first fingers 18 extending upwardly from a first side of the body and having at least one, preferably two, second fingers 20 extending upwardly from a second side thereof. A hand-held portable telephone 12 is captured intermediate the first 18 and second 20 fingers for convenient storage and access thereto. The body 10 is supported by a universally adjustable mounting device 14 which attaches the body 10 to a desired portion of the automobile 11.

The universally adjustable mounting device preferably comprises a "SLIMLINE" mounting device such as that manufactured by Panavise Products, Inc., of Sparks, Nev., however other similar devices such as that described in detail in U.S. Pat. No. 4,836,485 issued to Cooper on Jun. 6, 1989, are contemplated herein, the disclosures of which are hereby incorporated by reference. As will be recognized, such devices provide a means whereby the body 10 can be rapidly mounted to a wide variety of surfaces and once attached, the body 10 can be oriented as desired. The hand-held portable telephone mount of the present invention may be mounted to a variety of different mounting devices such as the mounting device of U.S. Pat. No. 4,836,485. Alternatively, no such mounting device may be utilized and the hand-held portable telephone mount of the present invention is then mounted directly to a desired surface, i.e. an automobile dashboard or console.

Referring now to FIGS. 2-6, the body 16 is formed having grooves 24 into which the bases 54 of the first fingers 18 are slidably disposed. Slots 26 receive tabs 62 which depend downwardly from the bases 54 of the fingers 18. Each tab 62 has a threaded aperture 64 formed therein such that an adjustment screw 52 may be threaded therethrough and likewise through first 34 and second 36 apertures (best seen in FIG. 5) of the body 16 to facilitate lateral adjustment of the first fingers 18. Spring 48 disposed about adjustment screw 52 biases fingers 18 inwardly to remove any slack therefrom. Cap 74 frictionally engages the proximal end of adjusting screw 52 to capture adjusting screw 52 within the body 12.

Figure 5:
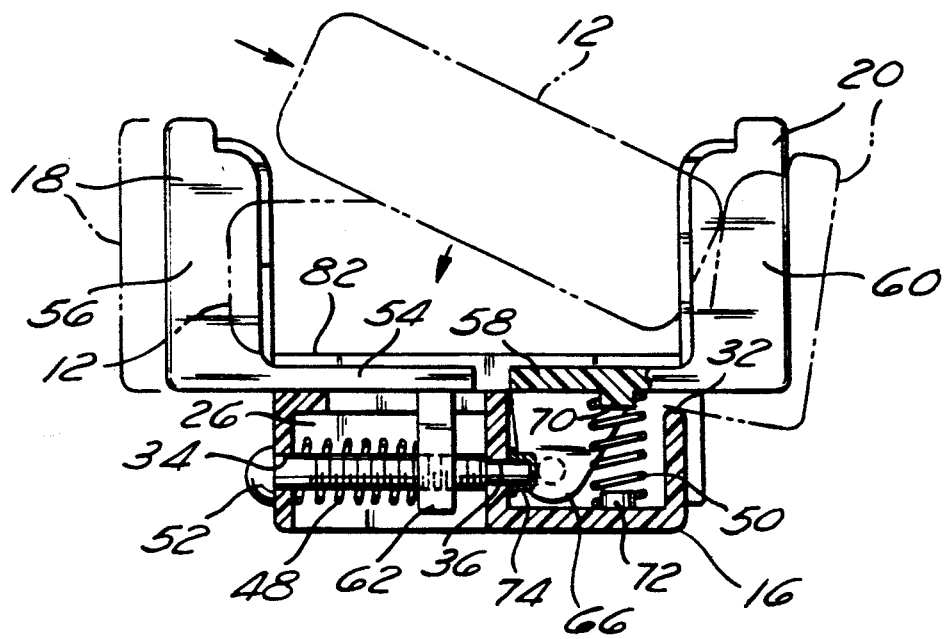
FIG. 5 is a cross-sectional end view of the hand-held portable telephone holder taken along lines 5 of FIG. 3.
Figure 6:
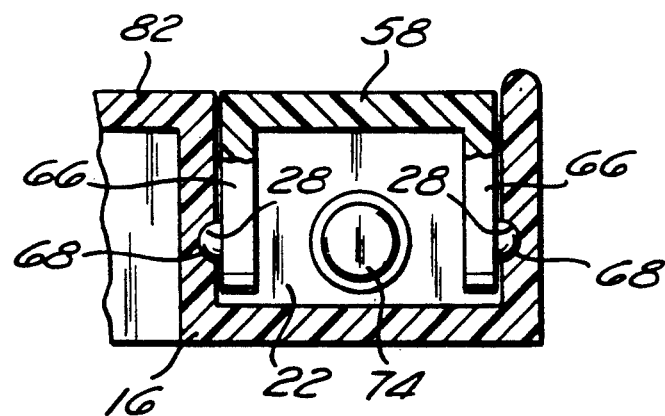
FIG. 6 is an enlarged cross-sectional view of the hand-held portable telephone holder taken along lines 6 of FIG. 3.

Recesses 22 formed in the body 16 receive the bases 58 and tabs 66 of the second fingers 20. Male pivot detents 68 formed upon downwardly depending tabs 66 of the second fingers 20 engage complimentary female pivot detents 28 formed upon the walls of the recess 22 to pivotally capture second fingers 22 such that they may pivot between vertical and outwardly angled positions (as illustrated in FIG. 5). Springs 50 bias the second fingers 20 into their vertically disposed positions.

Finger grip recesses 30 are formed along the edge of the body 16 proximate the second fingers 20. The finger grip recesses 30 facilitate easy grasping and removal of the hand-held portable telephone 12 from the hand-held portable telephone holder 10.

Each first finger 18 comprises an upwardly extending or vertical portion 56 and a base 54. The base 54 is sized to be slidably received by the groove 24 formed in the body 16. Each second finger 20 is likewise comprised of an upwardly extending or vertical portion 60 and a base 58. Threaded apertures 64 formed in downwardly depending tabs 62 receive the threaded portion of adjustment screw 52 to facilitate lateral positioning adjustment of the first fingers 18 as discussed above. The bases 58 of fingers 20 are configured to be received by recesses 22. Male pivot detent 68 formed upon downwardly depending tabs 66 engage corresponding female pivot detents 28 formed upon the body to facilitate outward pivoting of the second fingers 20 as discussed above.

Figure 2:
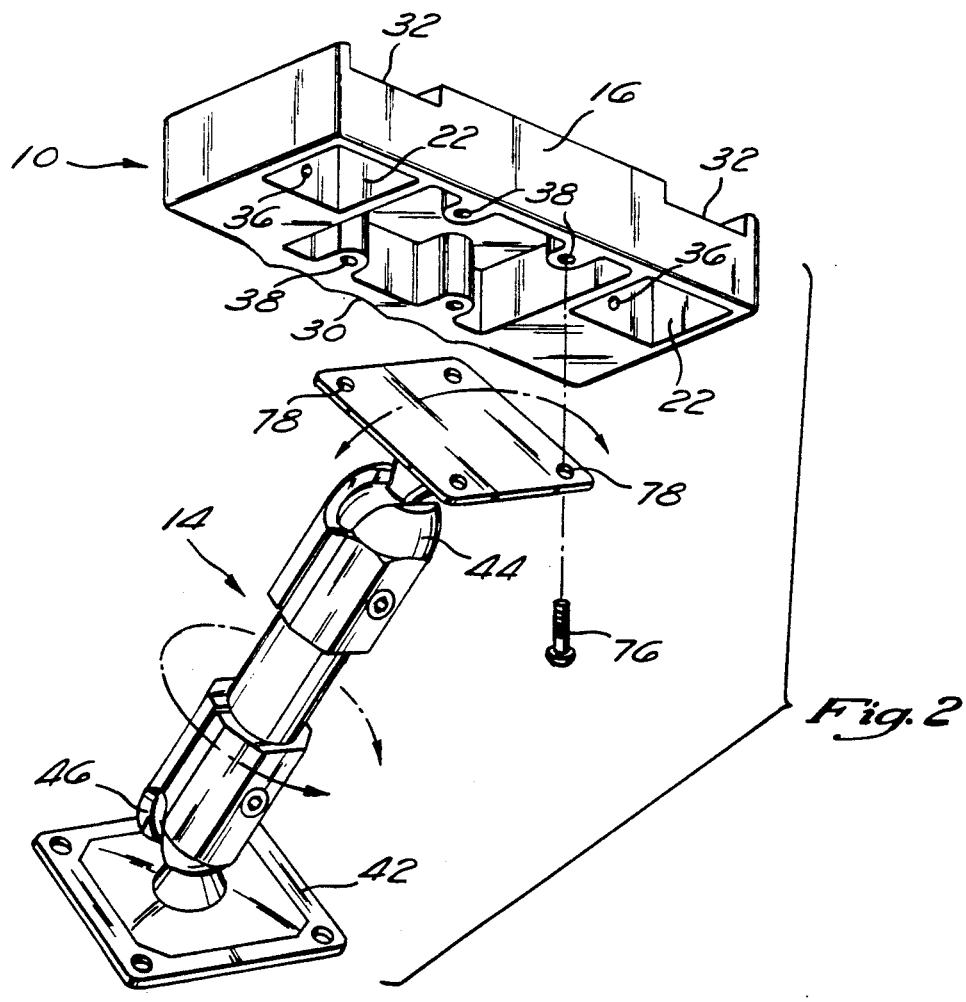
FIG. 2 is an enlarged, partially exploded view of the hand-held portable telephone holder of FIG. 1.

Having thus described the structure of the hand-held portable telephone holder of the present invention, it may be beneficial to describe the operation thereof. The body 16 of the hand-held portable telephone holder 10 is attached to the universally adjustable mounting device 14 by inserting mount screws 76 (as seen in FIG. 2) through apertures 78 formed in the upper mount plate 40 of the universally adjustable mounting device 14 and into the threaded mount apertures 38 of the body 16 to attach the body 16 to the universally adjustable mounting device 14. Mount screws 80 (as seen in FIG. 1) similarly attach the lower mount plate 42 to a desired portion of an automobile or other surface. The universally adjustable mounting device 14 is then manipulated to position the hand-held portable telephone holder 10 of the present invention in a desired orientation as illustrated in FIG. of the drawings.

Referring now to FIG. 5, a hand-held portable telephone 12 may be disposed within the hand-held portable telephone holder 10 by pressing the hand-held portable telephone 12 against the second fingers 20, thereby causing the second fingers 20 to spread slightly, such that the hand-held portable telephone 12 may be received between the first 18 and second 20 fingers of the hand-held portable telephone holder 10. The hand-held portable telephone 12 is then urged downward into a position substantially laminarly juxtaposed to the upper surface 82 of the body 16. A hand-held portable telephone 12 or similar article may thus be captured between the first 18 and second fingers 20 under the tension of spring 50.

To remove the hand-held portable telephone 12 from the hand-held portable telephone holder 10, the hand-held portable telephone 12 is grasped and may be pulled straight upward therefrom or rocked outwardly against the spring 50 biased second fingers 20 in a process similar to the reverse of the insertion process. Finger grip recesses 30 facilitate grasping of the hand-held portable telephone 12.

The lateral position of the first fingers 18 may be varied by turning adjustment screw 52 to cause the first fingers 18 to slide inward or outward. The distance between the first 18 and second 20 fingers can thus be varied such that the first 18 and second 20 fingers snugly grasp the hand-held portable telephone 12 when the hand-held portable telephone 12 is positioned therebetween.

It is understood that the exemplary hand-held portable telephone holder described herein and shown in the drawings represents only a presently preferred embodiment of the invention. Indeed, various modifications and additions may be made to such embodiment without departing from the spirit and scope of the invention. For example, the device need not be specifically configured to receive a hand-held portable telephone, but rather may be configured to receive a wide variety of other devices. Indeed, various configurations of the body and upwardly extending first and second fingers are contemplated. Thus, these and other modifications and additions may be obvious to those skilled in the art and may be implemented to adapt the present invention for use in a variety of different applications.

What is claimed is:

1. A portable telephone holder comprising:
   a generally rectangular body having an upper surface against which the portable telephone is positionable and first and second longitudinally extending side surfaces;
   a pair of first fingers attached to said body and extending upwardly from said first side surface in a generally perpendicular orientation relative said upper surface, each of said first fingers being independently, laterally adjustable relative said first side surface; and
   a pair of second fingers pivotally attached to said body and extending upwardly from said second side surface, each of said second fingers being spring-biased to a generally perpendicular orientation relative said upper surface and being independently pivotal outwardly relative said second side surface in a direction away from said first fingers;
   said portable telephone being disposed within said holder by pressing the telephone against the second fingers in a manner causing the second fingers to pivot away from said first fingers, and urging the telephone downwardly against the upper surface so as to capture the telephone between the first and second fingers, the lateral adjustability of the first fingers being adapted to facilitate the holding of telephones of various widths and configurations between the pairs of first and second fingers.

2. The device of claim 1 further comprising a plurality of finger grip recesses formed in said second side surface between the pair of second fingers to facilitate removal of the portable telephone from the holder.

3. The device of claim 1 further comprising a universally adjustable mounting device attached to said body for positioning said body at a desired location.

4. A portable telephone holder, comprising:
   a generally rectangular body having an upper surface against which the portable telephone is positionable and first and second longitudinally extending side surfaces;
   at least one first finger attached to said body and extending upwardly from said first side surface, said first finger being laterally adjustable relative said first side surface; and
   at least one second finger pivotally attached to said body and extending upwardly from said second side surface, said second finger being spring-biased toward said first finger and being pivotal outwardly relative said second side surface in a direction away from said first finger;
   said portable telephone being disposed within said holder by pressing the telephone against the second finger in a manner causing the second finger to pivot away from the first finger, and urging the telephone downwardly against the upper surface so as to capture the telephone between the first and second fingers, the lateral adjustability of the first finger being adapted to facilitate the holding of telephones of various widths.

* * * * *